(12) United States Patent
Balagopal et al.

(10) Patent No.: US 9,039,918 B2
(45) Date of Patent: May 26, 2015

(54) LITHIUM-ION-CONDUCTING MATERIALS

(71) Applicants: Shekar Balagopal, Sandy, UT (US); Roger Marc Flinders, West Valley, UT (US); Spencer Jackman, Flagstaff, AZ (US)

(72) Inventors: Shekar Balagopal, Sandy, UT (US); Roger Marc Flinders, West Valley, UT (US); Spencer Jackman, Flagstaff, AZ (US)

(73) Assignee: CERAMATEC, INC., Salt Lake City, UT (US)

( * ) Notice: Subject to any disclaimer, the term of this patent is extended or adjusted under 35 U.S.C. 154(b) by 200 days.

(21) Appl. No.: 13/742,989

(22) Filed: Jan. 16, 2013

(65) Prior Publication Data

US 2014/0197351 A1    Jul. 17, 2014

(51) Int. Cl.
*H01G 9/02* (2006.01)
*C04B 35/447* (2006.01)
(Continued)

(52) U.S. Cl.
CPC ............. *C04B 35/447* (2013.01); *C04B 35/19* (2013.01); *C04B 35/6261* (2013.01); *H01M 10/052* (2013.01); *C04B 2235/3203* (2013.01); *C04B 2235/3217* (2013.01); *C04B 2235/3232* (2013.01); *C04B 2235/3244* (2013.01); (Continued)

(58) Field of Classification Search
CPC ................ C04B 35/447; H01M 4/382; H01M 2300/0071

USPC .................................. 252/62.2; 510/4, 10, 46
See application file for complete search history.

(56) References Cited

U.S. PATENT DOCUMENTS 5,702,995 A    12/1997  Fu
2009/0197183 A1   8/2009  Kato
(Continued)

FOREIGN PATENT DOCUMENTS

EP            2181791           5/2010

OTHER PUBLICATIONS

Chang, Bong H., "International Search Report", PCT/US2013/021730 (corresponding to U.S. Appl. No. 13/742,989), (Apr. 30, 2013), 1-4.

(Continued)

*Primary Examiner* — Khanh Tuan Nguyen
(74) *Attorney, Agent, or Firm* — David Fonda

(57) ABSTRACT

Lithium-ion-conducting ceramic materials are disclosed having characteristics of high lithium-ion conductivity at low temperatures, good current efficiency, and stability in water and corrosive media under static and electrochemical conditions. Some general formulas for the lithium-ion-conducting materials include $M^I_{1+x+z-\delta}M^{III}_{\delta}M^{IVa}_yM^{IVb}_{2-x-y}M^V_zP_{3-z}O_{12}$ and $M^I_{1+x+4z-\delta}M^{III}_xM^{IVa}_yM^{IVb}_{2-x-y-z}P_3O_{12}$, wherein $M^I$ comprises Li, Na, or mixtures thereof; $0.05<x<0.5$, $0.05<y<2$, $0\le z<3$, and $0\le\delta<0.5$; $M^{III}$ comprises Al, Hf, Sc, Y, La, or mixtures thereof; $M^{IVa}$ comprises Zr, Ge, Sn, or mixtures thereof; $M^{IVb}$ comprises Ti; and $M^V$ comprises Si, Ge, Sn, or mixtures thereof. In some cases, the lithium-ion conducting materials are formed through a process in which the materials' powdered precursors are milled after being calcined and before being sintered. The milling process may include using milling media of multiple sizes.

21 Claims, 9 Drawing Sheets

(51) Int. Cl.
*C04B 35/19* (2006.01)
*C04B 35/626* (2006.01)
*H01M 10/052* (2010.01)
*H01M 10/056* (2010.01)
*H01M 10/0562* (2010.01)

(52) U.S. Cl.
CPC ..... *C04B2235/34* (2013.01); *C04B 2235/3418* (2013.01); *C04B 2235/77* (2013.01); *C04B 2235/96* (2013.01); *H01M 10/056* (2013.01); *H01M 10/0562* (2013.01); *H01M 2300/0071* (2013.01); *Y02E 60/122* (2013.01)

(56) References Cited

U.S. PATENT DOCUMENTS

2010/0028782 A1 2/2010 Inda
2011/0318651 A1 12/2011 Leitner et al.

OTHER PUBLICATIONS

Chang, Bong H., "Written Opinion of the International Searching Authority", PCT/US2013/021730 (corresponding to U.S. Appl. No. 13/742,989), Apr. 30, 2013, 1-7.

Jackman, et al., "Effect of Microcracking on Ionic Conductivity in LATP", *Journal of Power Sources*, vol. 218 (Elsevier) (Nov. 15, 2012),65-72.

Jackman, et al., "Stability of NaSICON-type Li1.3Al0.3Ti1.7P3O12 in aqueous solutions", *Journal of Power Sources*, vol. 230 (Elsevier) (May 15, 2013),251-60.

| Anolyte | Catholyte | mA/cm2 | Average V | Temp (°C) | Time (hr) | Phases |
|---|---|---|---|---|---|---|
| LiOH | LiOH | 22 | 3.5 | 50 | 60-70 | A - NTP main phase, remainder LTP, C - Shifted LTP |
| LiCl | LiCl | 11 | 3.4 | 40 | 115 | A - NTP main phase remainder LTP, C - LTP main phase, significant NTP formation |
| LiCl | LiCl | 22 | 4.5 => 3.5 | 40 | 43 | A - NTP main phase remainder LTP, C - LTP main phase, significant NTP formation |
| LiNO3 | LiNO3 | 22 | 6 | 50 | 136 | A - NTP main phase, remainder LTP, C - Shifted LTP |
| LiOH | LiNO3 | 22 | 4.6 | 50 | 144 | A - NTP main phase, remainder LTP with slight Li3PO4, C - LTP with slight NTP formation |

*Fig. 5*

LITHIUM-ION-CONDUCTING MATERIALS

RELATED APPLICATIONS

This application claims priority to, and the benefit of, U.S. Provisional Patent No. 61/587,039 filed on Jan. 16, 2012 and entitled LITHIUM-ION-CONDUCTING MATERIALS, which application is incorporated by reference.

FIELD OF THE INVENTION

The present invention relates in general to ion-conducting ceramic materials. More particularly, the present invention provides lithium-ion-conducting ceramic materials and methods for producing the same. The disclosed lithium-ion-conducting materials are useful in many applications, but especially in electrochemical systems involving electrochemical reactions of solutions containing lithium ions.

BACKGROUND OF THE INVENTION

Our society has come to rely on electrochemical cells (such as batteries, fuel cells, and electrolytic cells) to perform a wide variety of functions. Batteries in particular are used to power a myriad of devices, including computers, cell phones, portable music players, lighting devices, as well as many other electronic components. Batteries are currently being developed to power automobiles and/or provide load-leveling capabilities for wind, solar, or other energy technologies. The "information age" increasingly demands portable energy sources that provide lighter weight, higher energy, longer discharge times, more "cycles", and smaller customized designs. To achieve these advances, technologists continue to work to develop batteries with higher energy densities while still providing acceptable safety, power densities, cost, and other needed characteristics.

Batteries and other electrochemical cells come in a wide variety of different chemistries and structures. Each chemistry and/or structure has different advantages and disadvantages. For example, batteries that utilize dense cation transferring ceramic membranes as the primary electrolyte may advantageously have higher faradaic efficiencies (in some cases, close to 100 percent) and longer shelf lives (i.e., lower rates of self-discharge) than some other battery chemistries. In this regard, LiSICON (Lithium SuperIonic CONductor) is one type of ceramic material that is selective to lithium ions (i.e., conducts only lithium ions) and that can be useful as an electrolyte in a wide variety of electrochemical cells.

Despite the utility of ceramic membranes in electrochemical cells, some cells (such as batteries) that utilize dense ceramic membranes as the primary electrolyte may have some drawbacks. For example, some of these ceramic materials may be relatively poor ion conductors at room temperature. Additionally, some such ceramic materials may be relatively porous, which can lower their conductivity and allow for undesired leakage through the materials. Furthermore, some of these ceramic materials can have relatively poor phase purity, which can reduce conductivity, lead to cracking, catastrophic failure, and otherwise reduce the material's utility.

Thus, while ceramic materials are often used in electrochemical cells to selectively transportions, challenges still exist. Accordingly, it would be an improvement in the art to augment or even replace current materials and techniques with other materials and techniques.

BRIEF SUMMARY OF THE INVENTION

The present invention relates to lithium-ion-conductive materials. Some general formulas for the lithium-ion-conducting materials include:

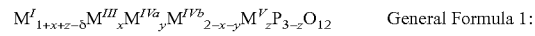

General Formula 1: $M^I_{1+x+z-\delta}M^{III}_xM^{IVa}_yM^{IVb}_{2-x-y}M^V_zP_{3-z}O_{12}$

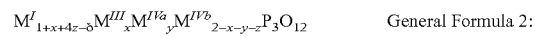

General Formula 2: $M^I_{1+x+4z-\delta}M^{III}_xM^{IVa}_yM^{IVb}_{2-x-y-z}P_3O_{12}$

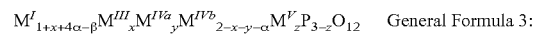

General Formula 3: $M^I_{1+x+4\alpha-\beta}M^{III}_xM^{IVa}_yM^{IVb}_{2-x-y-\alpha}M^V_zP_{3-z}O_{12}$ In some non-limiting implementations of the lithium-ion-conducting materials of General Formulas 1, 2, and 3, $M^I$ comprises Li, Na, or mixtures thereof; $M^{III}$ comprises Al, Hf, Sc, Y, La, or mixtures thereof; $M^{IVa}$ comprises Zr, Ge, Sn, or mixtures thereof; $M^{IVb}$ comprises Ti; $M^V$ (as found in General Formulas 1 and 3) comprises Si, Ge, Sn, or mixtures thereof. Additionally, with respect to variables x, y, z, these variables can be any suitable number that allows the described materials to be structurally stable and that allows the electro-neutrality of the elements in the materials to be maintained so that the materials (not accounting for the effect of $\delta$, $\alpha$, and $\beta$) have no net positive or negative charge. Furthermore, the variables $\delta$, $\alpha$, and $\beta$ can be any suitable number that allows the described materials to be structurally stable and to either be electro-neutral or to be deficient in one of the elements (e.g., lithium-deficient, titanium-deficient, or deficient in another 4+ valence element).

In some non-limiting implementations, in General Formulas 1 and 2 the variables x, y, z, and $\delta$ are as follows: $0.05<x<0.5$, $0.05<y<2$, $0\leq z<3$, and $0\leq\delta<0.5$. In other non-limiting implementations, in General Formula 2 the variables x, y, z, and $\delta$ are as follows: $0\leq x\leq 0.5$, $0\leq y\leq 2$, $0\leq z\leq 3$, and $0\leq\delta\leq 1$. In still other non-limiting implementations, in General Formula 3, the variables x, y, z, $\alpha$, and $\beta$ are as follows: $0.05\leq x\leq 0.5$, $0.05\leq y\leq 2$, $0\leq z\leq 1$, $0.05\leq\alpha\leq 0.5$, $0\leq\beta\leq 1$. In yet other non-limiting implementations of the materials produced in accordance with either General Formula 1 or 2, $0.05<x<0.5$, $0.05<y<2$, $0<z<3$ and $0<\delta<0.5$.

In addition to the aforementioned formulas, in some other non-limiting implementations of the described materials, the materials are made in accordance with one of the following formulas:

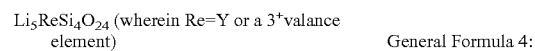

General Formula 4: $Li_5ReSi_4O_{24}$ (wherein Re=Y or a 3+valance element)

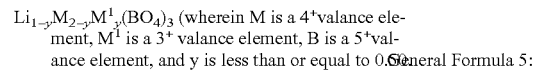

General Formula 5: $Li_{1-y}M_{2-y}M^1_y(BO_4)_3$ (wherein M is a 4+valance element, $M^1$ is a 3+ valance element, B is a 5+valance element, and y is less than or equal to 0.6)

The described materials can be formed through any suitable process that allows them to be used as an ion-conductive material. In some non-limiting implementations, the materials are formed through a process in which the materials' powdered precursors are milled, after being calcined and before being sintered. In some such implementations, the milling process also includes using milling media of multiple sizes. Indeed, in one non-limiting example, the milling media comprises large media (e.g., media with a diameter of about 10 μm) and small media (e.g., media with a diameter of about 5 μm). Additionally, in some cases, the milling process lasts for over 80 hours.

While lithium-ion conducting materials that are made through the described processes and in accordance with one of the General Formulas can have any suitable characteristic, in some non-limiting implementations such materials have such a low porosity and high density that they are hermetic to helium gas. In still other non-limiting implementations, the described materials have a relatively-high phase purity (as determined through X-ray diffraction).

While the described materials may be particularly useful in batteries and electrolytic cells, the skilled artisan will recognize that the described materials can be used in virtually any application requiring a lithium-ion-conductive ceramic material. For example, the described materials can be used in fuel cells, lithium salt separation, chemical synthesis, and other suitable applications. Furthermore, while the described processing methods may be particularly useful for making the described lithium-ion-conductive materials, the skilled artisan will recognize that such methods can be used in the processing of a wide variety of ion-selective, ceramic materials, including, without limitation, NaSICON-type materials, LiSICON-type materials, perovskites, and multioxide ceramics.

Other advantages and aspects of the present invention will become apparent upon reading the following description of the drawings and detailed description of the invention. These and other features and advantages of the present invention will become more fully apparent from the following figures, description, and appended claims, or may be learned by the practice of the invention as set forth hereinafter.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings depict only typical embodiments of the invention and are not therefore to be considered to be limiting of its scope, the invention will be described and explained with additional specificity and detail through the use of the accompanying drawings in which:

Figure 3:
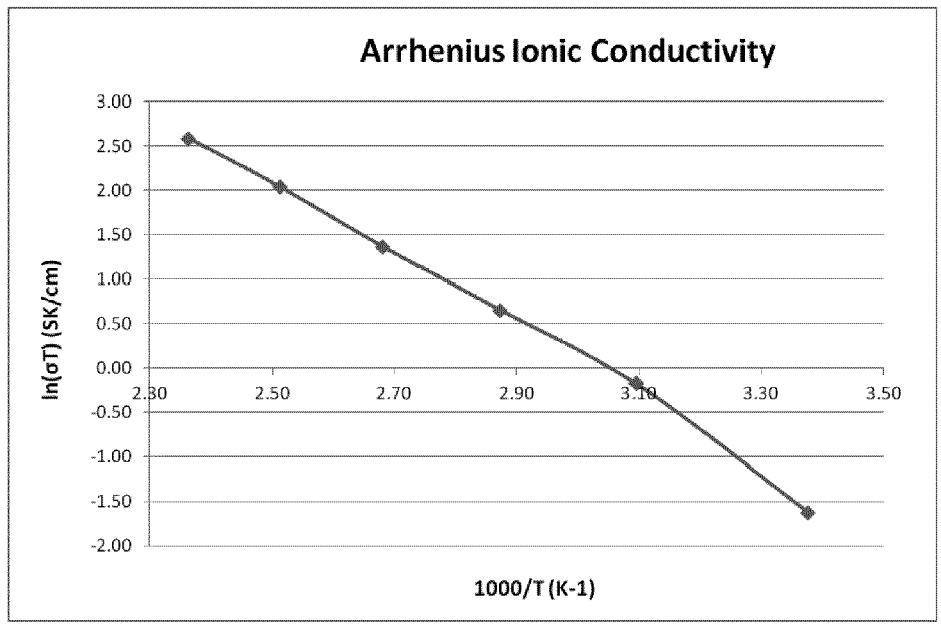
Figure 4:
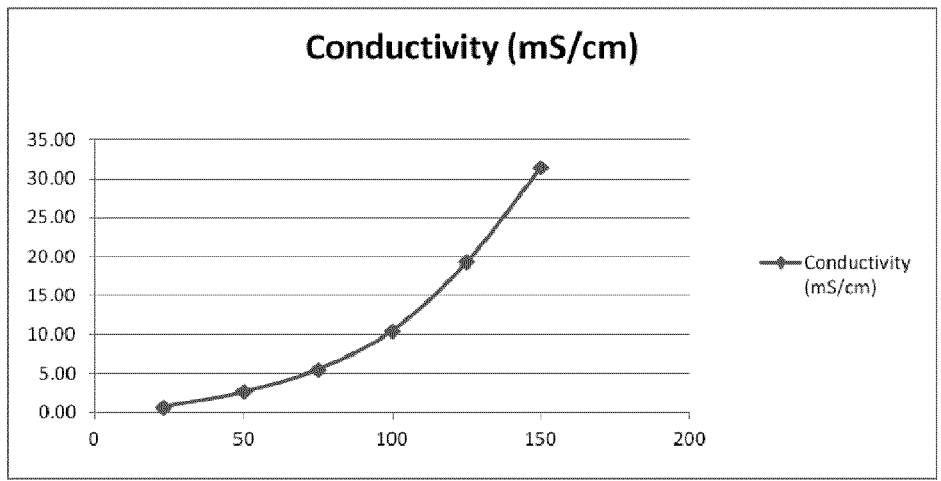

FIGS. 3-4 each depict a graph showing some non-limiting experimental results relating to the lithium-ion conductivity of a lithium-ion-conducting material;

FIG. 5 contains a table showing some non-limiting electrochemical performance and corrosion properties of certain lithium-ion-conducting materials; and FIGS. 6-12 each depict a computer-generated graph showing some non-limiting experimental results.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of suitable lithium-ion-conductive materials, milling media, processing methods, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention relates to ion-conductive ceramic materials that are configured to allow alkali ions (e.g., Li$^+$ and/or Na$^+$) to be selectively transported therethrough, while other ions and substances are prevented from passing through the described materials. Although some embodiments of the materials may be used to selectively transport sodium ions (e.g., Na+), other embodiments of the materials (as focused on herein) are used to selectively conduct lithium ions while preventing sodium ions from passing therethrough. Some general formulas for the described lithium-ion-conducting ceramic materials include:

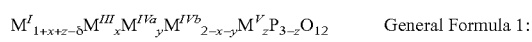 General Formula 1:

$M^I_{1+x+z-\delta}M^{III}_xM^{IVa}_yM^{IVb}_{2-x-y}M^V_zP_{3-z}O_{12}$

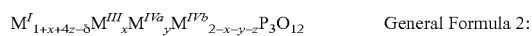 General Formula 2:

$M^I_{1+x+4z-\delta}M^{III}_xM^{IVa}_yM^{IVb}_{2-x-y-z}P_3O_{12}$

 General Formula 3:

$M^I_{1+x+4\alpha-\beta}M^{III}_xM^{IVa}_yM_{2-x-y-\alpha}M^V_zP_{3-z}O_{12}$

In each of the General Formulas, the variables $M^I$, $M^{III}$, $M^{IVa}$, $M^{IVb}$, and $M^V$ can each comprise any suitable element that allows compositions made in accordance with such formulas to selectively conduct lithium ions. Indeed, in some non-limiting embodiments, $M^I$ comprises Li, Na, or mixtures thereof. In this regard, while in some embodiments, $M^I$ comprises Li, in other embodiments, $M^I$ comprises Li and Na, wherein the concentration of Li is relatively high with respect to the concentration of Na. Lithium may be used exclusively to transfer lithium ions, sodium may be substituted to transfer sodium ions, and mixtures of lithium and sodium may be used as required to reduce insensitivity to specific ions in feed stream Additionally, in some embodiments, $M^{III}$ comprises Al, Hf, Sc, Y, La, or mixtures thereof; $M^{IVa}$ comprises Zr, Ge, Sn, or mixtures thereof; $M^{IVb}$ comprises Ti; and $M^V$ (as found in General Formulas 1 and 3) comprises Si, Ge, Sn, or mixtures thereof.

With respect to the variables x, y, and z, these variables can be any suitable number that allows the compositions to be structurally stable and that also allows the electro-neutrality of the elements in the described lithium-ion conducting materials to be maintained so that the described compositions (when ignoring δ, α, and β (or when δ, α, and β are each zero)) have no net positive or negative charge. In other words, the variables x, y, and z can be any suitable number that (when ignoring δ, α, and β) allows the total charge of elements with a positive charge to balance the total charge of elements with a negative charge in the composition. By way of non-limiting example, where a composition comprises lithium titanium phosphate (LiTi$_2$P$_3$O$_{12}$, wherein Li has 1$^+$charge, Ti has a 4$^+$ charge, P ha a 5$^+$charge, and O has a 2$^-$ charge), the overall positive charge of elements in the composition (1*1+2*4+ 3*5=24 positive) is equal to the overall negative charge of the oxygen in the composition (12*2=24 negative).

Regarding the variables δ, α, and β, these variables can be any suitable number that allows the described materials to be structurally stable (e.g., no element is so large or so small as to compromise the materials' structural stability) and to selectively transport lithium ions. In some embodiments, however, where δ, α, and/or β are greater than zero, the described materials have a deficiency in one or more elements. Indeed, in some non-limiting embodiments in which $\delta$ and/or $\beta$ are greater than zero, the described materials are lithium-deficient. Additionally, in some embodiments in which $\alpha$ is greater than zero, the described materials are titanium- (or another 4+ valence element)-deficient.

In some non-limiting embodiments, in General Formulas 1 and 2 the variables x, y, z, and $\delta$ are as follows: $0.05<x<0.5$, $0.05<y<2$, $0\leq z<3$, and $0\leq \delta<0.5$. In other non-limiting embodiments, in General Formula 2 the variables x, y, z, and $\delta$ are as follows: $0\leq x\leq 0.5$, $0\leq y\leq 2$, $0\leq z\leq 3$, and $0\leq \delta\leq 1$. In still other non-limiting embodiments, the variables x, y, z, $\alpha$, and $\beta$ in General Formula 3 are as follows: $0.05\leq x\leq 0.5$, $0.05\leq y\leq 2$, $0\leq z\leq 1$, $0.05\leq \alpha\leq 0.5$, $0\leq \beta\leq 1$. In yet other non-limiting embodiments of the materials produced in accordance with either General Formula 1 or 2, $0.05<x<0.5$, $0.05<y<2$, $0<z<3$ and $0<\delta<0.5$.

As mentioned above, in some non-limiting embodiments, materials produced in accordance with General Formulas 1 and 2, the variable x can be any suitable number between 0.05 and 0.5. Indeed, in some non-limiting embodiments, the variable x is as high as a number selected from about 0.3, about 0.4, and about 0.5, or as low as number selected from about 0.05, about 0.1, and about 0.2. Furthermore, in some embodiments, the variable x has a value located between any suitable combination or sub-range of the aforementioned numbers. In one example, the variable x is any suitable number from 0.1 to 0.4.

As previously mentioned, in some non-limiting embodiments, in materials produced according to General Formulas 1 and 2, the variable y is any suitable number between 0.05 and 2. Indeed, in some non-limiting embodiments, the variable y is as high as a number selected from about 0.3, about 1, about 1.5, and about 2, or as low as number selected from about 0.05, about 0.1, about 0.15, and about 0.2. Furthermore, in some non-limiting embodiments, the variable y has a value located between any suitable combination or sub-range of the aforementioned numbers. In one example, the variable x is any suitable number from 0.1 to 0.4.

As discussed above, in some non-limiting embodiments, in materials produced under General Formulas 1 and 2, the variable z can be any suitable number from 0 to a number that is less than 3. Indeed, in some non-limiting embodiments, the variable z is as high as a number selected from about 1.5, about 2, about 2.5, and about 2.9, or as low as number selected from about 0, about 0.1, about 0.5 and about 1. Furthermore, in some embodiments, the variable z has a value located between any suitable combination or sub-range of the aforementioned numbers. In one example, the variable z is any suitable number from 0.1 to 0.4.

Additionally, as previously stated, in some embodiments, materials produced in accordance with General Formulas 1 or 2, the variable 6 can be any suitable number from 0 to a number less than 0.5. Indeed, in some non-limiting embodiments, the variable 6 is as high as a number selected from about 0.25, 0.3, about 0.4, and about 0.49, or as low as number selected from about 0, about 0.05, about 0.1, and about 0.2. Furthermore, in some embodiments, the variable $\delta$ has a value located between any suitable combination or sub-range of the aforementioned numbers.

Furthermore, in embodiments in which the variables x, y, z, and $\delta$ in General Formula 2 are $0\leq x\leq 0.5$, $0\leq y\leq 2$, $0\leq z\leq 3$, and $0\leq \delta\leq 1$, the variables can be any suitable number in such ranges. Similarly, in embodiments in which the variables x, y, z, $\alpha$, and $\beta$ of General Formula 3 are $0.05\leq x\leq 0.5$, $0.05\leq y\leq 2$, $0\leq z\leq 1$, $0.05\leq \alpha\leq 0.5$, $0\leq \beta\leq 1$. The variables can be any suitable number in such ranges that allows the described materials function as described herein.

Some non-limiting examples of materials that are produced in accordance with the General Formulas:

TABLE 1

| Code | Formulation |
|---|---|
| 45B: | $Li_{1.6}Al_{0.3}Zr0.3Ti_{1.4}Si_{0.3}P_{2.7}O_{12}$ |
| 45B: | $Li_{1.6}Al_{0.3}Zr0.3Ti_{1.4}Si_{0.3}P_{2.7}O_{12}$ |
| 65C: | $Li_{1.7}Al_{0.4}Zr_{0.3}Ti_{1.3}Si_{0.3}P_{2.7}O_{12}$ |
| TS1: | $Li_{1.5}Al_{0.2}Zr_{0.3}Ti_{1.5}Si_{0.3}P_{2.7}O_{12}$ |
| LTP C: | $Li_{1.7}Al_{0.3}Ti_{1.6}(PO_4)_3$ |
| LIS-D: | $Li_3Zr_2Si_2PO_{12}$ |
| LIS-E: | $Li_{3.2}Zr_2Si_{2.2}P_{0.8}O_{12}$ |
| LIS-F: | $Li_{3.4}Zr_2Si_{2.4}P_{0.6}O_{12}$ |
| LIS-G: | $Li_{3.1}Zr_2Si_{2.3}P_{0.7}O_{12-\delta}$ |
| LIS-GY: | $Li_{3.1}Zr_{1.951}Y_{0.049}Si_{2.3}P_{0.7}O_{12-\delta}$ |
| LIS-H: | $Li_{3.1}Zr_{1.65}Si_{2.3}P_{0.7}O_{12-\delta}$ |
| LIS-J: | $Li_{3.4}Zr_2Si_{2.6}P_{0.4}O_{12}$ |
| LIS-K: | $Li_{3.3}Zr_2Si_{2.3}P_{0.7}O_{12}$ |
| TL1-1a | $LiTi_2(PO_4)_3$ |
| TL1-1b | $Li_{1.3}Al_{0.3}Ti_{1.7}(PO_4)_3$ |
| TL1-1c | $Li_{1.3}Al_{0.3}Ti_{1.6}(PO_4)_3$ |
| TLI1-2c rebatch | $Li_{1.3}Al_{0.3}Ti_{1.6}(PO_4)_3$ |
| TLI-8a | $Li_{1.5}Al_{0.1}Ti_{1.8}(PO_4)_3$ |
| TL1-8b | $Li_{1.5}Al_{0.2}Ti_{1.7}(PO_4)_3$ |
| TLi-8c | $Li_{1.2}Al_{0.2}Ti_{1.8}(PO_4)_3$ |
| TL1-8d | $Li_{1.1}Al_{0.1}Ti_{1.9}(PO_4)_3$ |
| TLI-8e | $Li_{1.4}Al_{0.4}Ti_{1.6}(PO_4)_3$ |
| TL1-8f | $Li_{1.8}Al_{0.4}Ti_{1.5}(PO_4)_3$ |
| TL1-10a | $Li_{1.2}Al_{0.3}Ti_{1.7}(PO_4)_3$ |
| TL1-10b | $Li_{1.3}Al_{0.3}Ti_{1.7}P_3O_{12}$ |
| TL1-10c | $Li_{1.4}Al_{0.3}Ti_{1.7}(PO_4)_3$ |

In addition to the aforementioned General Formulas, the described materials can be made in accordance with any other suitable formula that allows the materials to be structurally stable and to selectively transport lithium ions. In this regard, some additional examples of suitable formulations of the lithium-ion conductive materials include:

General Formula 4: $Li_5ReSi_4O_{24}$ (wherein Re is Y or a 3+ valence element)

General Formula 5: $Li_{1-y}M_{2-y}M^1{}_y(BO_4)_3$ (wherein M is a 4+ valance element, $M^1$ is a 3+ valance element, B is a 5+ valance element, and y is less than or equal to 0.50).

The described lithium-ion-conducting materials can be produced in any suitable manner that is capable of forming a ceramic material having a formula that is in accordance with the General Formulas (discussed above). Indeed, the described materials can be produced through one or more high-temperature, solid-state reaction processes; co-precipitation processes; hydrothermal processes; pechini processes; or sol-gel processes. In some non-limiting embodiments, it may be advantageous to synthesize the lithium-ion-conducting ceramic materials by high-temperature, solid-state reaction processes. One non-limiting example of a fabrication process proceeds as follows. Lithium-ion-conducting materials in accordance with any of the General Formulas can be systematically synthesized by solid-state oxide mixing techniques. In one non-limiting example, a mixture of the material's starting precursors are mixed in methanol in polyethylene jars (or other suitable containers), and the mixed precursor oxides are dried at any suitable temperature that can evolve the solvent (e.g., 60° C.). The dried powder or material is then calcined at any suitable temperature that is capable of performing such a function (e.g., from about 800° C. to about 1200° C., depending on the composition). Following the calcination process, in some non-limiting embodiments, the calcined power is milled. In this regard, the calcined powder can be milled in any suitable manner that provides the calcined powder with a suitable (e.g., relatively narrow) particle size distribution and/or with a relatively high surface area (e.g., a high surface energy). By way of non-limiting example, the calcined powder may be milled using a technique such as vibratory milling, attrition milling, jet milling, ball milling, or another technique known to one of ordinary skill in the art. Indeed, in some embodiments, the calcined powder is milled through a vibration and/or an attrition milling technique. In this regard, because attrition milling may require less time, in some embodiments, the calcined powers are milled through an attrition milling process.

To achieve a suitable particle size distribution of the calcined powders, the milling process may include the use of milling media (as appropriate), which may include, but is not limited to, stabilized zirconia, with yttrium oxide, scandium oxide, stabilized alumina, or other media known to one of ordinary skill in the art. In this regard, the milling media can be any suitable size. Indeed, in some non-limiting embodiments, the milling media has a typical diameter that is as small as a diameter selected from about 1 mm, about 2 mm, about 3 mm, and about 4 millimeters. In contrast, in some non-limiting embodiments, the milling media has a typical diameter that is as large as a diameter selected from about 5 mm, about 8 mm, about 10 mm, and about 12 mm. Furthermore, in some non-limiting embodiments, the milling media can have a diameter between any suitable combination or sub-range of the aforementioned diameters. For example, the milling media can have an average diameter of about 5 mm or about 10 mm, ±1.5 mm.

In some non-limiting embodiments, the milling media comprises media of multiple sizes. Furthermore, in some non-limiting embodiments, the milling media comprises a mixed disk media that comprises media of 2, 3, 4, 5, 6, or more different sizes. In some non-limiting embodiments, however, the milling media comprises milling media of 2 different sizes. In this regard, the milling media can comprise any suitable combination of different sized milling media (as discussed above). By way of non-limiting example, the milling media can comprise small media having a diameter between about 3 mm and about 7 mm (e.g., about 5 mm±1 mm) and large media having a diameter between about 8 mm and about 12 mm (e.g., about 10 mm±1 mm).

Where the milling media comprises mixed-disk media of different sizes, the milling media can comprise any suitable amount of each of the different sizes of media. In some non-limiting embodiments where the milling media comprises a large media and a small media (as discussed above), the milling media can comprise a concentration of the large media selected from an amount as high as about 60%, about 65%, about 70%, and about 80%, with the small media accounting for the remaining portion of the media. In contrast, in some non-limiting embodiments, the milling media comprises a concentration of the large media selected from an amount as low as about 35%, about 40%, about 50%, and about 55%, with the small media accounting for the remaining portion of the media. In other non-limiting embodiments, the milling media can comprise any suitable combination or sub-range of the aforementioned concentrations of large and small media. By way of non-limiting example, the large media (e.g., media with a diameter of about 10 mm±1 mm) can account for 60%±5% of the milling media, with the small media (e.g., media with a diameter of about 5 mm±1 mm) accounting for the remaining portion of the milling media.

As part of the milling process, the calcined powders can be milled for any suitable period that allows them to have a suitable particle size distribution for forming a ceramic material upon sintering. In one non-limiting example, the calcined powders are milled for an amount of time that is as short as a time period selected from about 40 hours, about 80 hours, about 100 hours, and about 110 hours. In contrast, in some embodiments, the calcined powders are milled for an amount of time as long as a time period selected from about 120 hours, about 130 hours, about 180 hours, and about 240 hours. Moreover, in some embodiments, the calcined materials are milled for a period of time selected from any suitable combination or sub-range of the aforementioned time periods. In one non-limiting example, the calcined material is milled for between about 100 and about 140 hours (e.g., about 120 hours±5 hours).

The described milling processes may provide the calcined powders (and the final materials) with one or more beneficial characteristics. In one non-limiting example, the described milling processes can mechanically activate the powers and allow them to have a high surface area (e.g., high surface energy) with a narrow particle distribution of about 0.1 to about 8 microns. As another non-limiting example, the described milling processes can allow for the fabrication of dense lithium-ion-conducting ceramic materials that are hermetic to helium gas (e.g., materials having a total porosity of less than about 0.1%). Additionally, it has been found that by milling the calcined powdered precursor, in some cases the required sintering temperature can be lower (e.g., by about 100 degrees Celsius) than that used in some conventional methods for producing ion-conductive membranes.

Moreover, it has been found that in some non-limiting embodiments, the described milling processes can improve phase purity of the ceramic materials that are produced therethrough. By way of non-limiting example, FIG. 1 shows the results of an X-ray diffraction scan conducted on three similar ion-conductive materials comprising $Li_{1.3}Al_{0.3}Ti_{1.7}P_3O_{12}$ (or LTP-B) (while the LTP-B composition is different from the disclosed materials, it is expected that the described milling processes will have a similar effect on materials produced in accordance with any of the General Formulas).

Figure 1:
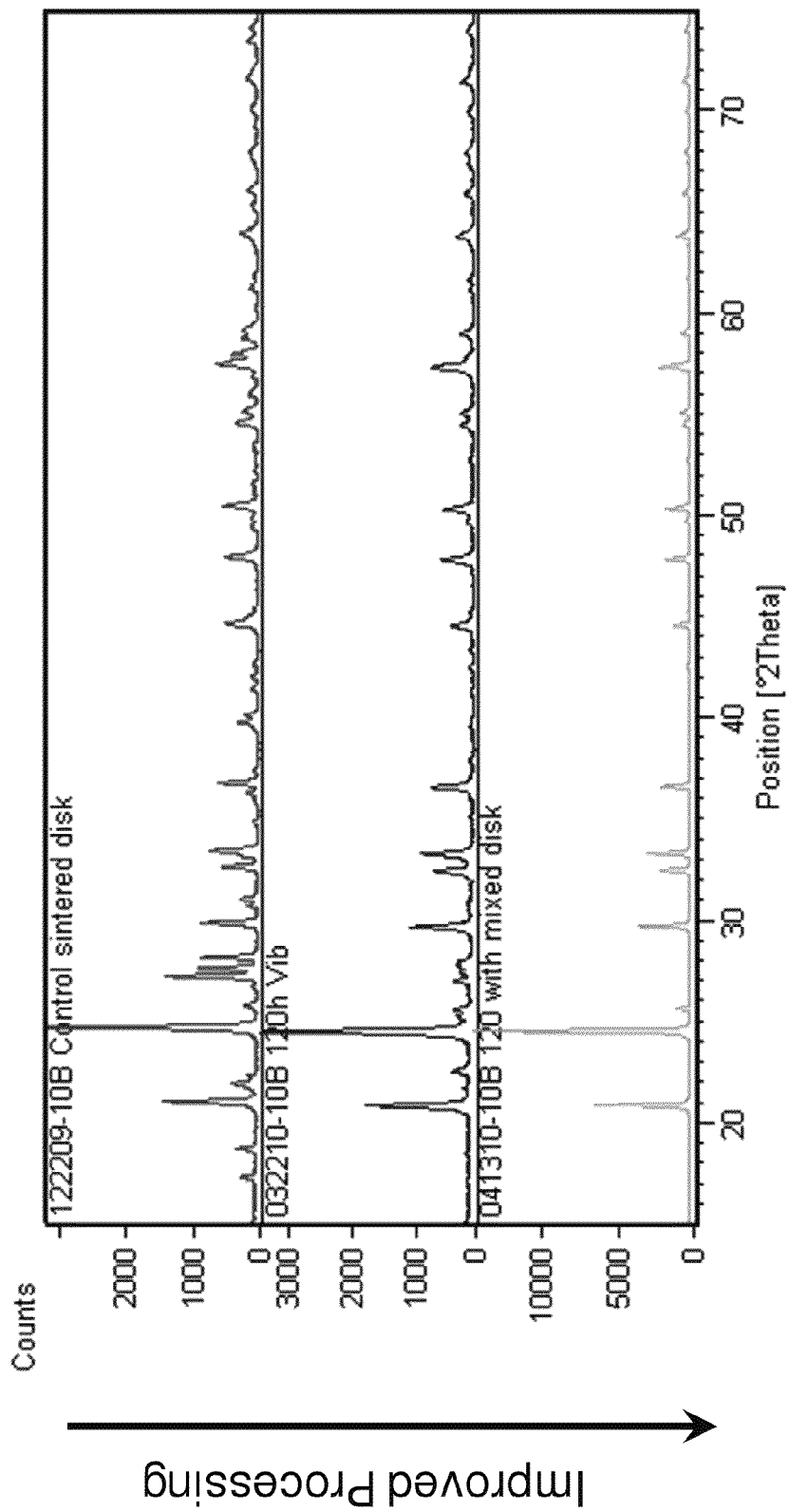
FIG. 1 depicts X-ray diffraction graphs showing improvement in phase purity based upon processing methods.

With regard to the three samples shown in FIG. 1, the top graph shows a control sample that was prepared through a process involving vibration milling for 48 hours with a sintered disk. By way of comparison, the middle graph in FIG. 1 shows a similar sample that was prepared according to the same method as the control sample, except that this second sample was subjected to vibration milling for 120 hours. In this regard, the middle graph in FIG. 1 shows that by increasing the milling time, the secondary phases (as illustrated by the peaks) in the sample are reduced. Furthermore, the bottom graph in FIG. 1 shows that when a sample similar to that used to generate the top and middle graphs is prepared through a similar process as the other two samples, except that it is subjected to 120 hours of mixed disk milling, the sample prepared with mixed disk milling has a significant reduction in secondary phases over the control sample and the middle sample.

Figure 2:
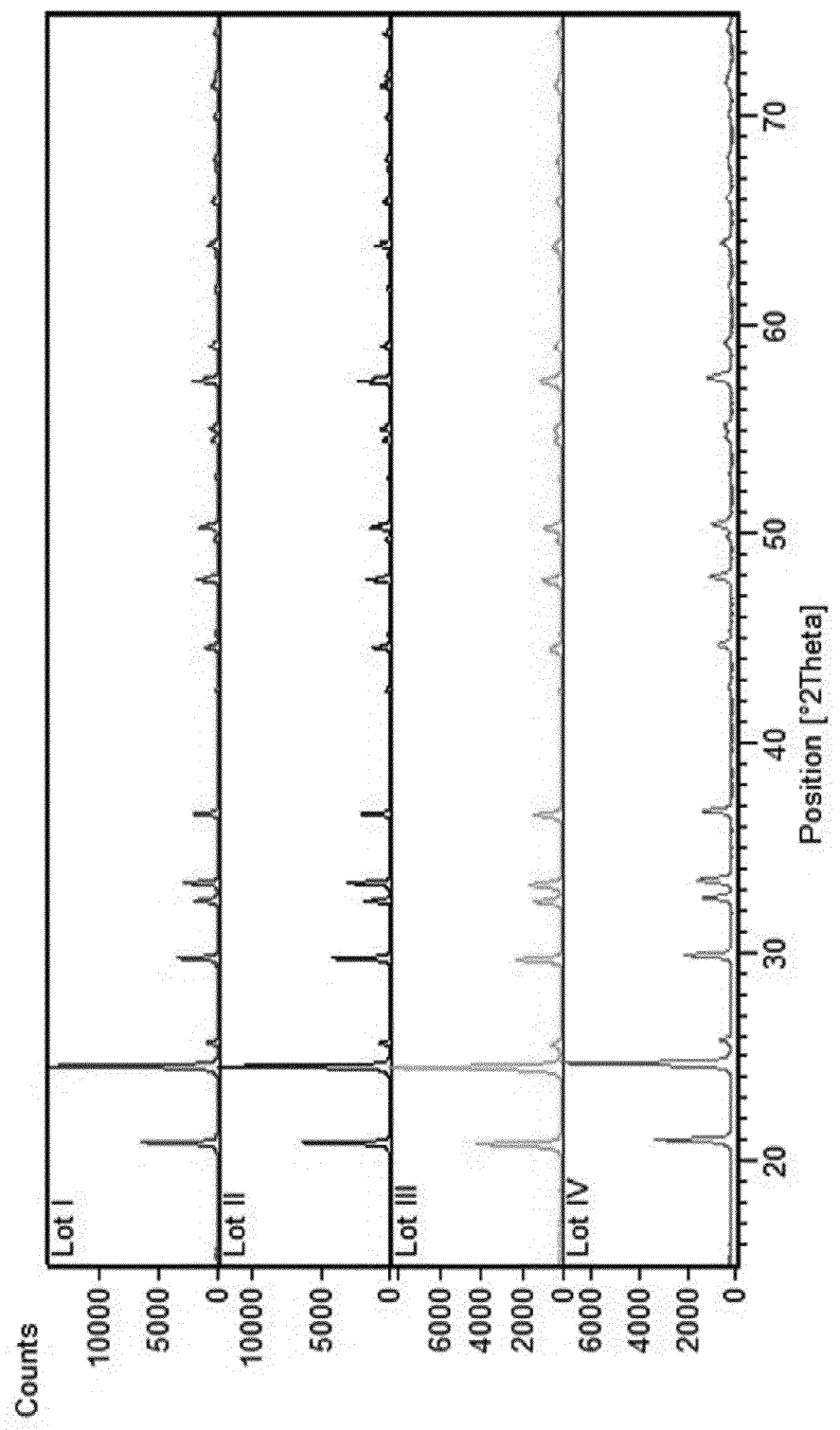
FIG. 2 depicts X-ray diffraction graphs showing reproducible phase purity of multiple batches of a material prepared through a single method.

FIG. 2 shows that the results from the bottom graph in FIG. 1 are reproducible. Specifically, FIG. 2 shows that when samples of a conventional ion-conducting ceramic material that were prepared through the same process as the sample used to generated the results displayed in the bottom graph of FIG. 1 are taken from four consecutive lots over a period of 7 months, each sample has a significant reduction in its secondary phases. Accordingly, FIGS. 1 and 2 show that processes for preparing ion-conductive membranes that include milling calcined powdered precursors through with mixed disk media for an extended period of time (e.g., about 120 hours) tend to improve the homogeneity of the materials.

Following the milling process, the milled powdered precursors can be prepared in a green-form in any suitable manner that allows the green-form material to later be turned into a ceramic material (e.g., membrane). Such methods include, but are not limited to, tape casting, calendaring, embossing, punching, laser-cutting, solvent bonding, lamination, heat lamination, extrusion, co-extrusion, centrifugal casting, slip casting, gel casting, die casting, pressing, isostatic pressing, hot isostatic pressing, uniaxial pressing, and sol-gel processing. In some non-limiting embodiments it may be advantageous to fabricate the ceramic membrane in a green form by die-pressing, optionally followed by isostatic pressing. In other non-limiting embodiments, it may potentially be advantageous to fabricate the ceramic membrane as a multi-channel device in a green form using a combination of techniques, such as tape casting, punching, laser-cutting, solvent bonding, heat lamination, or other techniques known to one of ordinary skill in the art. In one non-limiting example, a ceramic membrane according to one of the General Formulas is produced in a green form by being pressed in a die, then being isostaticly pressed.

In some embodiments, the resulting green form ceramic membrane may then be sintered to form a lithium-ion-conductive ceramic membrane using a technique known to one of ordinary skill in the art, such as conventional thermal processing in air, or controlled atmospheres to minimize loss of individual components of the lithium-ion-conductive ceramic membranes. Indeed, in one non-limiting example, a green form of the described materials is sintered in air in the range of from about 925° C. to about 1300° C. In another example the materials may be sintered in air in the range of from about 1000° C. to about 1150° C. from up to about 8 hours to up to about 12 hours to make dense, sintered lithium-ion-conductive ceramic membrane structures. Standard X-ray diffraction analysis techniques may then be performed to identify the crystal structure and phase purity of the lithium-ion-conductive ceramic materials in the sintered ceramic membrane.

In some specific embodiments, the described lithium-ion-conductive ceramic membranes are optionally fabricated by a vapor deposition method onto a porous support, including at least one of the following methods: physical vapor deposition, chemical vapor deposition, sputtering, thermal spraying, or plasma spraying. In one embodiment, this step is done after the powder calcination step. The thickness of the lithium-ion-conductive ceramic membrane formed by a vapor deposition method onto a porous support is generally from about 1 μm to about 100 μm, but may be varied as is known to one of ordinary skill in the art.

Indeed, the described materials can be produced through one or more high-temperature, solid-state reaction processes; co-precipitation processes; hydrothermal processes; pechini processes; or sol-gel processes. In some non-limiting embodiments, it may be advantageous to synthesize the lithium-ion-conducting ceramic materials by high-temperature, solid-state reaction processes. One non-limiting example of a fabrication process proceeds as follows. Lithium-ion-conducting materials in accordance with any of the General Formulas can be systematically synthesized by solid-state oxide mixing techniques. In one non-limiting example, a mixture of the material's starting precursors are mixed in methanol in polyethylene jars (or other suitable containers), and the mixed precursor oxides are dried at any suitable temperature that can evolve the solvent (e.g., 60° C.). The dried powder or material is then calcined at any suitable temperature that is capable of performing such a function (e.g., from about 800° C. to about 1200° C., depending on the composition).

The lithium-ion-conducting ceramic materials disclosed herein may be used or produced in any suitable form as would be understood by one of ordinary skill in the art. In some specific embodiments, the form of the lithium-ion-conducting ceramic materials may be a membrane and may include at least one of the following: monolithic flat plate geometries, supported structures in flat plate geometries, monolithic tubular geometries, supported structures in tubular geometries, monolithic honeycomb geometries, or supported structures in honeycomb geometries.

In another non-limiting embodiment, the described lithium-ion-conducting membranes are supported membranes or other structures known to those of skill in the art. In this regard, supported structures or membranes may comprise dense layers of lithium-ion-conducting ceramic material supported on porous supports. A variety of forms for the supported membranes are known in the art and would be suitable for providing the supported membranes for lithium-ion-conducting ceramic membranes with supported structures, including, but not limited to: ceramic layers sintered to below full density with resultant continuous open porosity, slotted-form layers, perforated-form layers, expanded-form layers including a mesh, or combinations thereof. In some non-limiting embodiments, the porosity of the porous supports is substantially continuous open-porosity so that liquid solutions on either side of the lithium-ion-conducting ceramic membranes may be in intimate contact with a large area of the dense-layers of lithium-ion-conducting ceramic material, and in some instances, the continuous open-porosity ranges from about 30 volume % to about 90 volume %. In some non-limiting embodiments, the porous supports for the supported structures may be present on one side of the dense layer of lithium-ion-conducting ceramic material. In some non-limiting embodiments, the porous supports for the supported structures may be present on both sides of the dense layer of a lithium-ion-conducting ceramic material.

A variety of materials for the porous supports or supported membranes are known in the art and would be suitable for providing the porous supports for the described lithium-ion-conducting ceramic membranes with supported-structures, including, without limitation: electrode materials, $\beta^{I}$-alumina, $\beta^{II}$-alumina, other ion-conducting ceramic solid electrolyte materials, and non-conductive materials, such as plastics or ceramic materials, metals, and metal alloys.

The thickness of the dense layer of a lithium-ion-conducting ceramic material in monolithic structures may be generally from about 0.3 mm to about 5 mm, and in some instances from about 0.5 mm to about 1.5 mm. The thickness of the dense layer of the lithium-ion-conducting ceramic material in supported-structures may be generally from about 25 μm to about 2 mm, and often from about 0.5 mm to about 1.5 mm. Layers as thin as about 25 μm to about 0.5 mm are readily producible, as would be understood by one of ordinary skill in the art. In some specific embodiments, the lithium-ion-conducting ceramic membranes are structurally supported by the cathode, which is porous. This may dictate characteristics of both the form of the lithium-ion conducting ceramic membranes, and/or of the cathode and/or anode. In some specific embodiments, the porous substrate has similar thermal expansion and good bonding with the lithium-ion-conducting ceramic membrane as well as good mechanical strength. One of ordinary skill in the art would understand that the number and configuration of the layers used to construct the lithium-ion-conducting ceramic membrane as supported-structures could be widely varied within the scope of the invention.

In some non-limiting embodiments of the lithium-ion-conducting ceramic materials disclosed herein, the lithium-ion-conducting membranes may be composites of lithium-ion-conducting ceramic materials with non-conductive materials, where the non-conductive materials are poor ionic and electronic electrical conductors under the conditions of use. A variety of insulative, non-conductive materials are also known in the art, as would be understood by one of ordinary skill in the art. In some non-limiting embodiments, the non-conductive materials include at least one of the following: ceramic materials, polymers, and/or plastics that are substantially stable in the media to which they are exposed.

In some non-limiting embodiments, layered lithium-ion-conducting ceramic-polymer composite membranes are also particularly suitable for use as lithium-ion-conducting ceramic membranes in the present invention. Layered lithium-ion-conducting ceramic-polymer composite membranes generally comprise ion-selective polymers layered on lithium-ion-conducting ceramic materials. Ion-selective polymer materials have the disadvantage of having poor selectivity to lithium ions, yet they demonstrate the advantage of high chemical stability.

In some non-limiting embodiments, the described lithium-ion-conducting ceramic membranes comprise two or more co-joined layers of different alkali-ion-conducting ceramic materials. Such co-joined alkali-ion-conducting ceramic membrane layers could include one or more MeSICON (e.g., conventional NaSICON-type, KSICON-type, LiSICON-type) materials, beta-alumina, etc. joined to one or more of the described lithium-ion-conducting ceramic materials. Such co-joined layers could be joined to each other using a method such as, but not limited to, thermal spraying, plasma spraying, co-firing, joining following sintering, etc. Other suitable joining methods are known by one of ordinary skill in the art and are included herein.

In some non-limiting embodiments, it may be beneficial, from an energy efficiency standpoint, to have the described lithium-ion-conducting ceramic membranes be relatively thin, so as to have a relatively low ohmic resistance and energy loss. In this regard, thin sheets of the described lithium-ion-conducting materials can be formed in any suitable manner, including without limitation, through tape casting. Indeed, sheets as thin as about 50 micrometers to 0.5 mm are readily producible. While such thin sheets can be supported in any suitable manner, in some non-limiting embodiments, they are supported on or between porous structural supports. Such structural supports may be the electrodes or porous ceramic sheets or plates. Additionally, while such supports can have any suitable porosity that allows the described materials to function as intended, in some non-limiting embodiments, the porosity of such ceramic supports is quite high so that the liquid solutions on either side of the supports may be in intimate contact with a large area of the electrolyte membrane. Porosity, as a percent of total volume for electrolyte supports, generally ranges from about 30 to about 70% porosity. In some non-limiting embodiments, the porous substrate also has a similar thermal expansion and good bonding with the lithium-ion-conducting membrane as well as good mechanical strength. If electrode materials are utilized as structural supports, then similar characteristics for these may also be present.

The described lithium-ion-conducting materials can have a variety of beneficial characteristics. Indeed, in some non-limiting embodiments, the described materials are: relatively dense; hermetic to helium gas; water impermeable; highly selective of lithium ions; current efficient; highly conductive to lithium ions at low temperatures, for example at room temperature or up to about 200° C., and/or stable in water, corrosive media, and under static and electrochemical conditions. Comparatively, beta alumina is a ceramic material with high ion conductivity at temperatures above 300° C., but has low conductivity at temperatures below 100° C., making it less practical for applications below 100° C.

In some non-limiting embodiments, the lithium-ion-conducting ceramic membranes produced in accordance with the first and second General Formula can have low or negligible electronic conductivity, and as such can aid in virtually eliminating the occurrence of any galvanic reactions when the applied potential or current is removed. The described lithium-ion-conducting materials can also have very mobile cations that provide high ionic conductivity, low electronic conductivity, and comparatively high corrosion resistance.

The lithium-ion-conducting ceramic materials disclosed herein may advantageously be used in electrochemical processes that would benefit from low temperature operation, high selectivity for lithium ions, good current efficiency, and stability in water and corrosive media under static and dynamic electrochemical conditions. Non-limiting examples of such processes include electrodialysis, salt splitting, salt recycling, waste separation, and electro-synthesis of value-added lithium or lithium-based chemicals from aqueous and non-aqueous lithium salts.

The following examples are given to illustrate various embodiments within the scope of the present invention. These are given by way of example only, and it is understood that the following examples are not comprehensive or exhaustive of the many types of embodiments of the present invention that can be prepared in accordance with the present invention.

EXAMPLE 1

In one example, the conductivity of the LIS-G material ($Li_{3.1}Zr_2Si_{2.3}P_{0.7}O_{12-\delta}$) was tested. The material was prepared by solid state mixing of precursor chemicals which then was calcined at temperature below 1000° C. and milled. 1.25 inch diameter parts were pressed and fired (sintered) in a furnace at about 1250° C. for a duration of about 8 hours. The sintered parts were machined to produce membrane at thickness around 0.06 inches. The membrane is assembled in a plastic plate by compression between o-rings. The plastic plate with membrane in assembled into a two compartment cell configuration. The cell is filled with organic liquid electrolyte such as 1M $LiPF_6$ (lithium triflate) chemical in polycarbonate solution. The electrodes are painted on the membrane and the lead wires from the electrodes are connected to the A.C. Impedance equipment. The conductivity of the LIS-G material was measured by A.C. Impedance method and calculated from the nyquist pot to be around $1\pm0.01\times10^{-4}$ σ, S/cm.

EXAMPLE 2

In a second example, the conductivity of a several samples of the LIS-G material, prepared through a variety of methods, were tested. In particular, Table 2 shows that when placed with platinum blocking electrodes in an aqueous solution of lithium hydroxide, a sample of LIS-G having a 1.25 inch diameter and 0.056 inches thick plan shaped ceramic membrane (prepared through an Al substitution process has a conductivity of about $0.14\pm0.01\times10^{-3}$ σ, S/cm. Additionally, Table 2 shows that when a sample of LIS-G having a 1.25 inch diameter and 0.056 inches thick plane shaped ceramic membrane (prepared through a process involving vibration milling) is tested as described above, the sample has a conductivity of $2.0\pm0.3\times10^{-3}$ σ, S/cm. Table 2 also shows that when a sample of LIS-G having a 1.25 inch diameter and 0.056 inches thick plan shaped ceramic membrane For purposes of comparison, Table 2 shows that when a sample of NAS-G and LIS-F.

were tested as described above, those samples respectively had conductivities of $2.7\pm0.1\times10^{-3}$ σ, S/cm and $2.2\pm0.1\times10^{-3}$ σ, S/cm.

TABLE 2

| Composition/Process | σ, S/cm |
| --- | --- |
| LIS-G, Al substituted | $0.14 \pm 0.01 \times 10^{-3}$ |
| LIS-G, vibration milled | $2.0 \pm 0.3 \times 10^{-3}$ |
| NAS-G | $2.7 \pm 0.1 \times 10^{-3}$ |
| LIS-F | $2.2 \pm 0.1 \times 10^{-3}$ |

EXAMPLE 3

As another non-limiting example, Table 3 shows that when conventional alkali-ion-conducting materials (e.g., $Li_{1.3}Al_{0.3}Ti_{1.7}P_3O_{12}$ (LATP-B)) are produced through a process involving subjecting the materials to mixed disk milling for approximately 120 hours, the resultant materials have several beneficial characteristics. Indeed, Table 3 shows the sample prepared with the 120 hours of mixed disk media has a room temperature total conductivity of about 0.67 mS.cm, a theoretic density of 97%, an activation energy of 0.35 eV, a relatively high 4-point bend strength of 147 MPa, a relatively high density of 2.86 g/cc, a Young's Modulus of 115 GPa, a relatively low (and unexpected) open porosity of 0.0%, and a fracture toughness of $1.1\pm0.3$ MPa√m. Accordingly, the skilled artisan will recognize that such techniques will likely have a similar effect when used to prepare the described lithium-ion conductive materials.

TABLE 3

| RT Total Conductivity (mS/cm) | Activation Energy (eV) | Density (g/cc) | % Open Porosity |
| --- | --- | --- | --- |
| 0.67 | 0.35 | 2.86 | 0.0 |

| % Theoretical Density | 4pt Bend Strength (MPa) | Young's Modulus (GPa) | Fracture toughness (MPa√m) |
| --- | --- | --- | --- |
| 97.0 | 147 | 115 | $1.1 \pm 0.3$ |

EXAMPLE 4

As one of the most important characteristics of any electrolyte is its ability to conduct and transportions, FIGS. 3 and 4 show the non-limiting results of a test in which the lithium-ion conductivity of a LTP-B sample ($Li_{1.3}Al_{0.3}Ti_{1.7}P_3O_{12}$) was tested through a four-probe A.C. impedance technique. In this regard, the sample was a 30,000 PSI isopressed pellet with a gold sputtered electrode, wherein the sample had a thickness of about 0.5009 cm, the electrode had a diameter of about 0.55 cm, wherein the test was conducted at ambient temperature (e.g., about 23 degrees Celsius), and wherein a titanium foil was used as in interface between the gold sputtered layer and the system cables. As a result of the test, FIG. 3 shows the corresponding Arrhenius plot of ionic conductivity and is based on activation energies for the tested membrane specimen as a function of temperature. Plotting the natural log of calculated conductivity times temperature as an increase function of temperature allows one to calculate the activation energy (~0.3-0.4 eV) along with high conductivity allows for low sensitivity to temperature. Because ions move by a thermally activated "hopping" motion between near equivalent sites, high temperature activation of structure is normally required to achieve reasonably high levels of ionic conductivity in most ionic solids. Some researchers focused their research on enhancing the grain boundary conductivity of solid electrolytes. In this regard, it has been found that lowering the activation energy through compositional change is one suitable method for increasing conductivity. Additionally, it has been found that one factor in increasing the ionic conductivity in LATP-based solid electrolytes can be performed by eliminating high impedance secondary phases. Furthermore, from the current test results, it has been found that grain boundary conductivity was greatly improved with the elimination of secondary phases which preferentially migrated to the grain boundaries. Once phase purity was achieved and shown to be reproducible, it was found that improved strength and enhanced ionic conductivity in LATP materials could also be accomplished by keeping grains below a critical size for micro-cracking.

EXAMPLE 5

FIG. 5 shows some non-limiting results for tests regarding the electrochemical performance and corrosion properties of some LTP compositions. In this regard, from testing membranes in several different Li-based feedstocks, as a general corrosion characteristic, there was no corrosion observed on the A-anode side or C-cathode side of the membranes. With regards to the membrane phases listed in FIG. 5, the term shifted LTP may refer to peak shifting from Na substitution from feedstock, and may refer to no peak shifting or to slight to significant formation of NTP. As a result of the tests, a first test demonstrated a substantially steady cell voltage during operation of a LTP-C membrane in a two-compartment cell using LiOH to transfer Li ions. A second test showed a substantially steady cell voltage during operation of a LTP C membrane in LiCl. A third test showed a substantially steady cell voltage during operation of a LTP-C membrane in LiCl. A fourth test showed a substantially steady cell voltage during operation of an LTP-C membrane in $LiNO_3$. Finally, a fifth test showed a substantially steady voltage during operation of a LTP-C membrane in LiOH, over a longer duration of operation.

EXAMPLE 6

Figure 6:
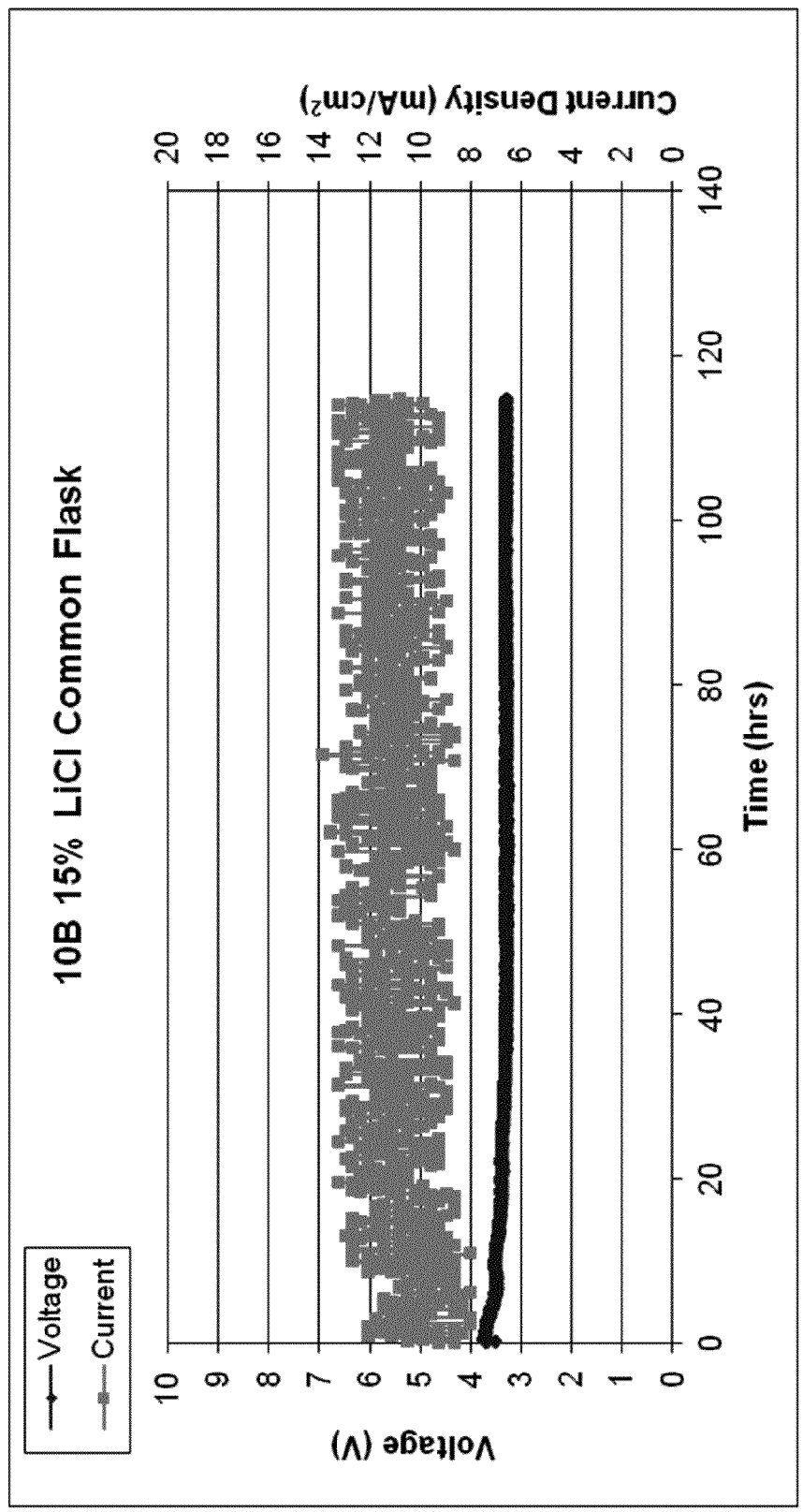

In another non-limiting example, FIG. 6 shows the results for the electrochemical cell testing of an LATP: LTP-B sample ($Li_{1.3}Al_{0.3}Ti_{1.7}P_3O_{12}$) placed in a two-compartment planar membrane cell having a 15 wt % LiCl anolyte and catholyte at room temperature. As a result of the test, FIG. 6 shows that the cell was able to transfer lithium ions from the anolyte to the catholyte so as to produce LiOH in the catholyte compartment. Furthermore, because FIG. 6 shows that the cell had a substantially steady voltage during the duration of the cell's operation, that figure shows that the membrane is substantially stable.

EXAMPLE 7

Figure 7:
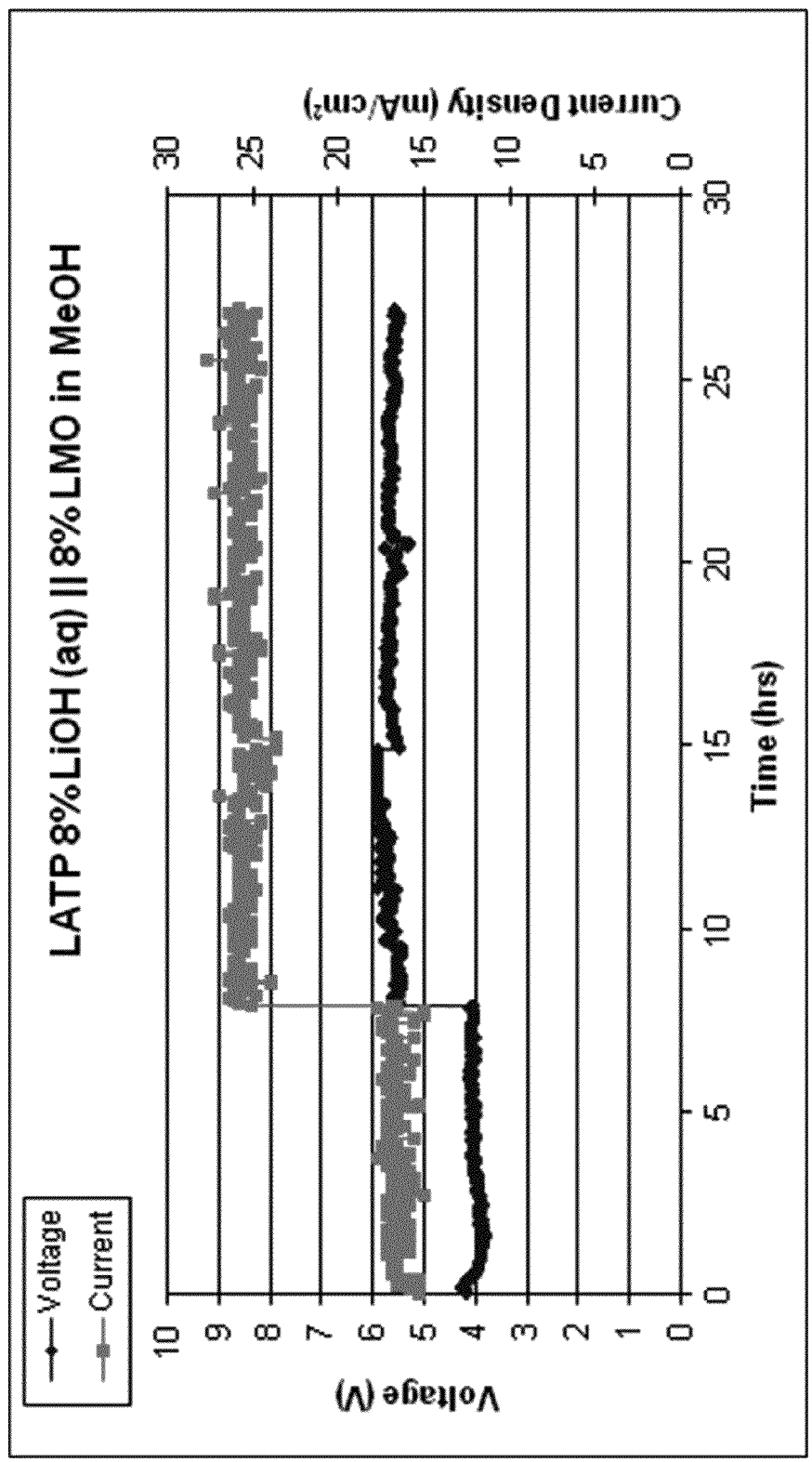

In still another non-limiting example, FIG. 7 shows the results for the electrochemical cell testing of an LATP: LTP-B sample ($Li_{1.3}Al_{0.3}Ti_{1.7}P_3O_{12}$) placed in a two-compartment planar membrane cell having a room-temperature, LiOH anolyte. As a result of this test, FIG. 7 shows that the cell was able to produce 8% lithium methoxide from a starting LiOH feedstock in the catholyte. Additionally, FIG. 7 shows that there was a change in cell voltage to demonstrate membrane operation at different currents.

EXAMPLE 8

Figure 8:
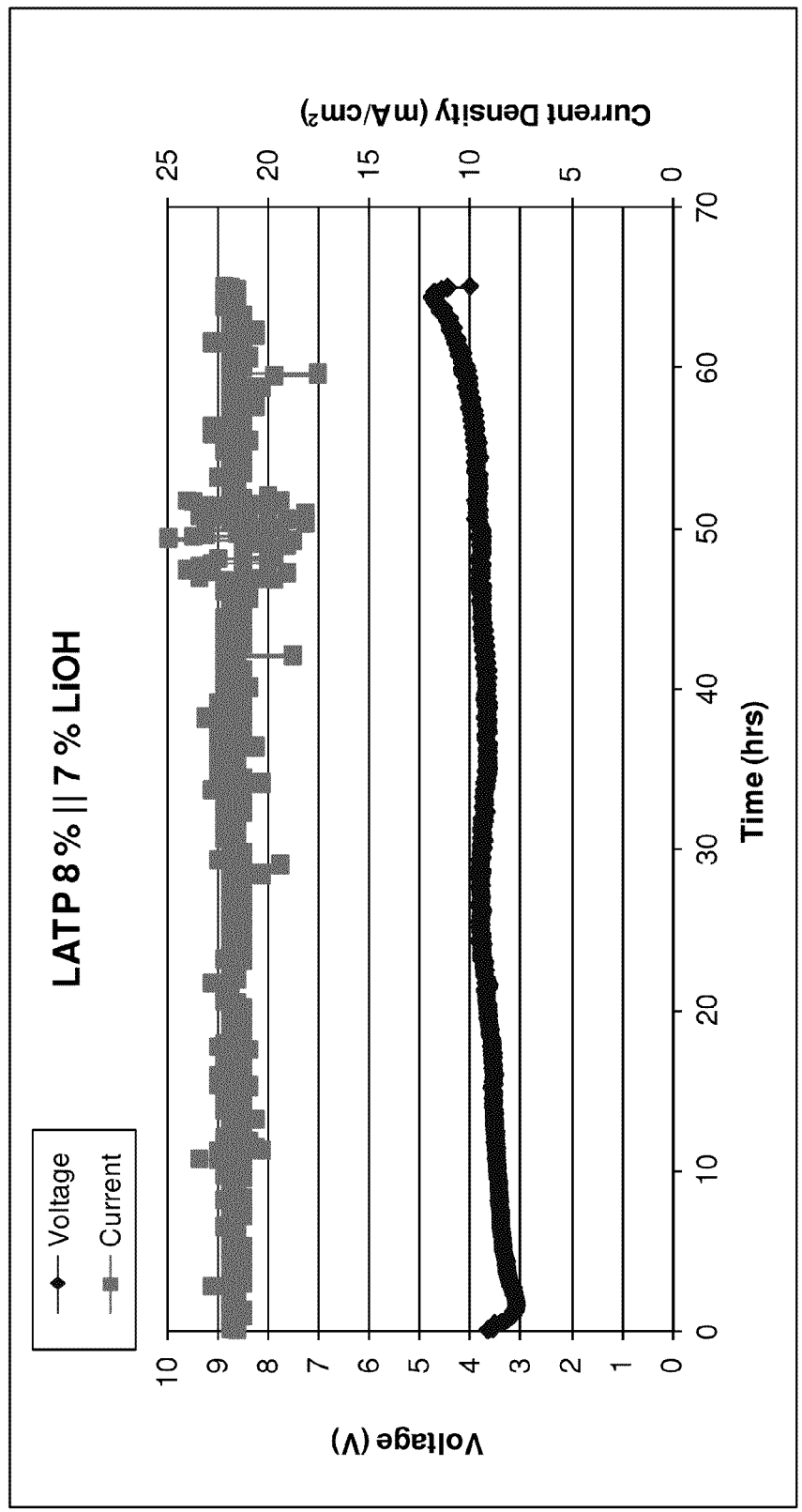

In yet another non-limiting example, FIG. 8 shows the results for the electrochemical cell testing of an LATP: LTP-B sample ($Li_{1.3}Al_{0.3}Ti_{1.7}P_3O_{12}$) placed in a two-compartment planar membrane cell having a LiOH anolyte and a LiOH catholyte at room-temperature. As a result of this test, FIG. 8 that the two-compartment cell was operated with an 8/7 wt % LiOH on the anolyte side and catholyte side to demonstrate lithium ion transfer. Additionally, FIG. 8 shows that as the cell operated, there was a fairly steady cell voltage to transfer target current.

EXAMPLE 9

In a non-limiting example illustrating some experimental results for a solid-state method used to determine the conductivity of LTP compositions (e.g., LTP-A, LTP-B, and LTP-C), 4-millimeter-thick LTP LiSICON membranes were sandwiched between thin Li metal foils and the solid-state conductivity of the LiSICON membranes was measured by AC impedance spectroscopy. In this regard, the LTP-A, LTP-B, and LTP-C compositions were respectively found to have a solid-state conductivity of $1.3\pm0.5\times10^{-4}$ σ, S/cm, $6.3\pm0.4\times10^{-4}$ σ, S/cm, and $2.7\pm0.7\times10^{-4}$ σ, S/cm.

EXAMPLE 10

Figure 9:
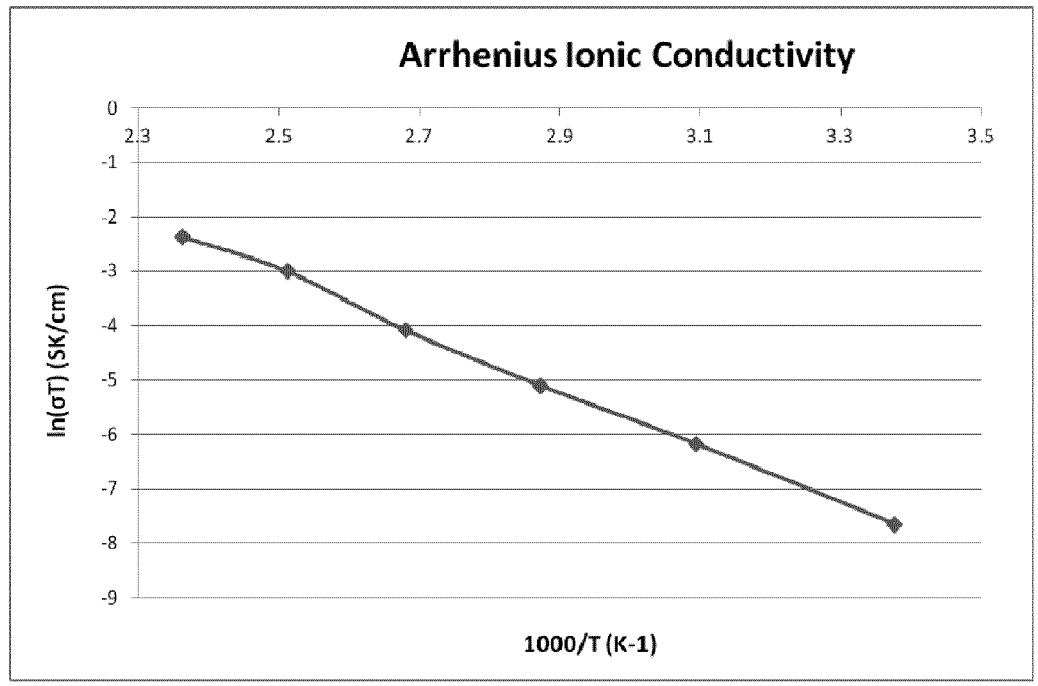
Figure 10:
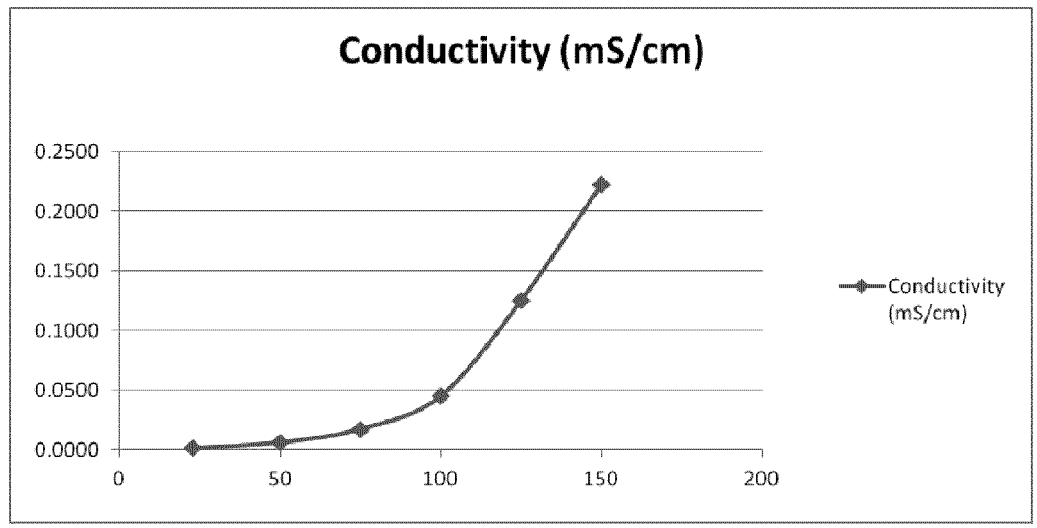

FIGS. 9 and 10 show the conductivity of a 65 C composition ($Li_{1.7}Al_{0.4}Ti_{1.3}Zr_{0.3}P_{2.7}Si_{0.3}O_{12}$). In this regard, the experimental setup was much like that used to obtain the test results shown above in FIGS. 3 and 4, except that a different type of membrane was used. FIGS. 9 and 10 show the Arrhenius plot of ionic conductivity and activation energies for tested membrane specimen as a function of temperature. Plotting the natural log of calculated conductivity times temperature as an inverse function of temperature allows one to calculate the activation energy. A low activation energy (~0.3-0.4 eV) along with high conductivity allows for low sensitivity to temperature. Lowering the activation energy through compositional changes is one method for increasing lithium ionic conductivity.

EXAMPLE 11

Figure 11:
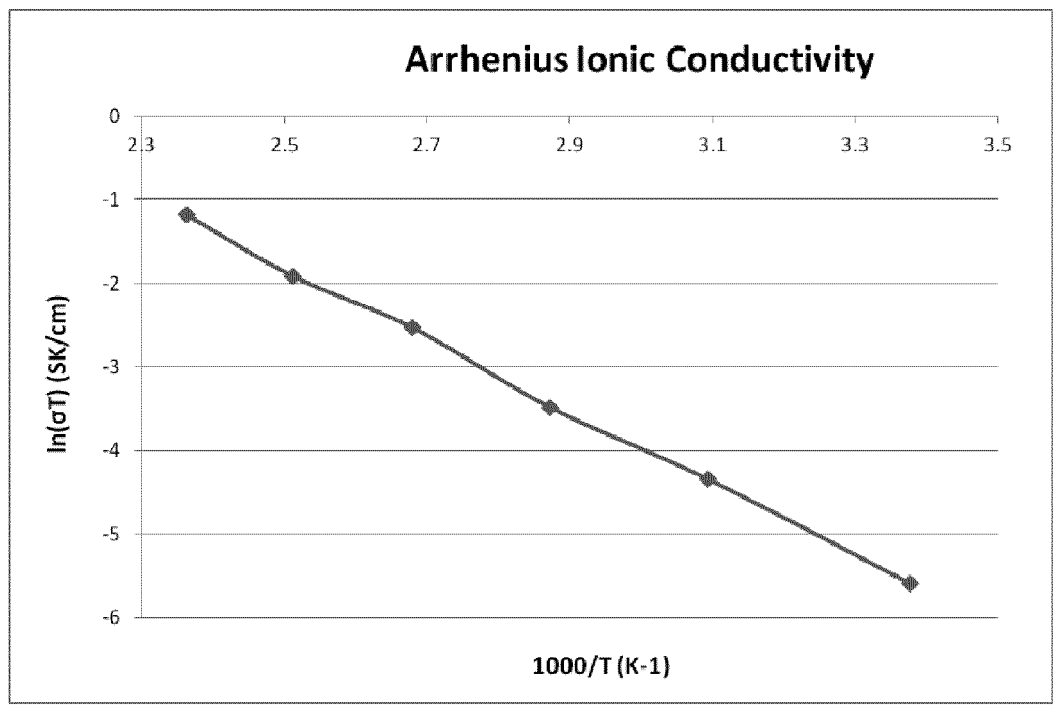
Figure 12:
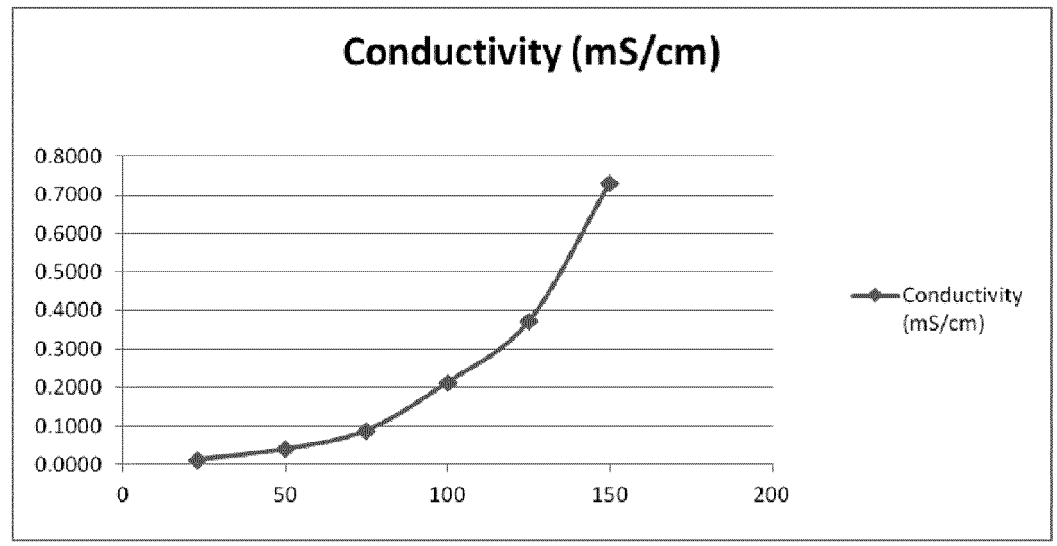

FIGS. 11 and 12 show the conductivity of a 45 B composition ($Li_{1.6}Al_{0.3}Ti_{1.4}Zr_{0.3}P_{2.7}Si_{0.3}O_{12}$). In this regard, the experimental setup was much like that used to obtain the test results shown above in FIGS. 3 and 4, except that a different type of membrane was used. FIGS. 11 and 12 show the Arrhenius plot of ionic conductivity and based on activation energies for tested membrane specimen as a function of temperature. Plotting the natural log of calculated conductivity times temperature as an inverse function of temperature allows one to calculate the activation energy. The conductivity of the 45 B composition as compared at room temperature is slightly higher than that of 65 C.

EXAMPLE 12

In a non-limiting example illustrating some experimental results for a solid-state method used to determine the conductivity of a LIS-H composition ($Li_{3.1}Zr_{1.65}Si_{2.3}P_{0.7}O_{12-\delta}$), 4-millimeter-thick LIS-H membranes were sandwiched between thin Li metal foils and the solid-state conductivity of the LIS-H membranes was measured by AC impedance spectroscopy. In this regard, the LIS-H, a; LIS-H, b; and LIS-H, c compositions were respectively found to have a solid-state conductivity of $7\pm0.01\times10^{-5}$ σ, S/cm, $4\pm0.7\times10^{-4}$ σ, S/cm, and $9\pm0.08\times10^{-5}$ σ, S/cm.

EXAMPLE 13

In another non-limiting example, the conductivity of several LIS-G membranes was tested. The membrane was assembled in a plastic plate by compression between o-rings. The plastic plate with membrane in assembled into a two compartment cell configuration. Platinum electrodes were painted on two sides of the membrane and the lead wires were connected to the potentiostat of the alternating current impendence equipment. The cell was filled with organic liquid electrolyte. The liquid electrolyte was a 1 Molar LiTriflate ($LiPF_6$) chemical in polycarbonate that acted as an organic separator. As a result of the testing, it was found that conductivity of a LIS-E, LIS-F, LIS-H, and LIS-G (which was prepared through vibration milling) were, respectively, $6.7\pm0.2\times10^{-5}$ σ, S/cm, $3.2\pm0.5\times10^{-5}$ σ, S/cm, $5.3\pm0.7\times10^{-5}$ σ, S/cm, and $3.0\pm0.3\times10^{-5}$ σ, S/cm. In this regard, the conductivity of the LIS-G membrane appears to show that, to at least some extent, membrane conductivity is dependent on the processing method and sintering conditions that are used to generate the membranes. While specific embodiments and examples of the present invention have been illustrated and described, numerous modifications come to mind without significantly departing from the spirit of the invention, and the scope of protection is only limited by the scope of the accompanying claims.

The invention claimed is:

1. A lithium ion conducting ceramic material having the general formulation:

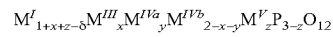

$$M^{I}_{1+x+z-\delta}M^{III}_{x}M^{IVa}_{y}M^{IVb}_{2-x-y}M^{V}_{z}P_{3-z}O_{12}$$

wherein $M^{I}$ comprises Li, Na, or a mixture thereof;
wherein $0.05<x<0.5$, $0.05<y<2$, $0\leq z<3$, $0<\delta<0.5$;
wherein $M^{III}$ comprises Al, Hf, Sc, Y, La, or mixtures thereof;
wherein $M^{IVa}$ comprises Zr, Ge, Sn, or mixtures thereof;
wherein $M^{IVb}$ comprises Ti; and
wherein $M^{V}$ comprises Si, Ge, Sn, or mixtures thereof.

2. The lithium ion conducting ceramic material according to claim 1, wherein $0<z<3$.

3. The lithium ion conducting ceramic material according to claim 1, wherein $M^{I}$ comprises Li.

4. The lithium ion conducting ceramic material of claim 1, wherein $M^{III}$ comprises Al.

5. The lithium ion conducting ceramic material of claim 1, wherein $M^{IVa}$ comprises Zr.

6. The lithium ion conducting ceramic material of claim 1, wherein $M^V$ comprises Si.

7. The lithium ion conducting ceramic material of claim 1, wherein $M^I$ comprises Li, wherein $M^{III}$ comprises Al, wherein $M^{IVa}$ comprises Zr, and wherein $M^V$ comprises Si.

8. A lithium ion conducting ceramic material having the general formulation:

$$M^I_{1+x+4z-\delta}M^{III}_xM^{IVa}_yM^{IVb}_{2-x-y-z}P_3O_{12}$$

wherein $M^I$ comprises Li, Na, or mixtures thereof;
wherein $0.05<x<0.5$, $0.05<y<2$, $0\leq z<3$, $0<\delta<0.5$;
wherein $M^{III}$ comprises Al, Hf, Sc, Y, La, or mixtures thereof;
wherein $M^{IVa}$ comprises Zr, Ge, Sn, or mixtures thereof; and
wherein $M^{IVb}$ comprises Ti.

9. The lithium ion conducting ceramic material according to claim 8, wherein $0<z<3$.

10. The lithium ion conducting ceramic material of claim 8, wherein $0.05\leq x\leq 0.45$.

11. The lithium ion conducting ceramic material of claim 8, wherein $0.05\leq y\leq 0.4$.

12. The lithium ion conducting ceramic material of claim 8, wherein $M^I$ comprises Li.

13. The lithium ion conducting ceramic material of claim 8, wherein $M^{III}$ comprises Al.

14. The lithium ion conducting ceramic material of claim 8, wherein the material is substantially devoid of $M^{IVa}$.

15. A lithium ion conducting ceramic material having the general formulation selected from (i)

$$M^I_{1+x+z-\delta}M^{III}_xM^{IVa}_yM^{IVb}_{2-x-y}M^V_zP_{3-z}O_{12}$$

and (ii)

$$M^I_{1+x+4z-\delta}M^{III}_xM^{IVa}_yM^{IVb}_{2-x-y-z}P_3O_{12},$$

wherein $M^I$ comprises Li, Na, or mixtures thereof;
wherein $0.05<x<0.5$, $0.05<y<2$, $0\leq z<3$, $0<\delta<0.5$;
wherein $M^{III}$ comprises Al, Hf, Sc, Y, La, or mixtures thereof;
wherein $M^{IVa}$ comprises Zr, Ge, Sn, or mixtures thereof;
wherein $M^{IVb}$ comprises Ti;
$M^V$ comprises Si, Ge, Sn, or mixtures thereof; and
wherein the lithium ion conducting ceramic material is hermetic to helium gas.

16. The lithium ion conducting ceramic material of claim 15, wherein the ceramic material is produced through a process in which powdered precursors of the material are milled for over 80 hours, after being calcined and before being sintered.

17. The lithium ion conducting ceramic material of claim 16, wherein the milling process includes using a first size of milling media and a second size of milling media that is large than the first size of milling media.

18. The lithium ion conducting ceramic material of claim 17, wherein the first size of milling media comprises a diameter between about 3 mm and about 7 mm in diameter.

19. The lithium ion conducting ceramic material of claim 17, wherein the second size of milling media comprises a diameter between about 8 mm and about 12 mm in diameter.

20. A lithium ion conducting ceramic material having the general formulation:

$$M^I_{1+x+4z-\delta}M^{III}_xM^{IVa}_yM^{IVb}_{2-x-y-z}P_3O_{12}$$

wherein $M^I$ comprises Li;
wherein $0\leq x\leq 0.5$, $0\leq y\leq 2$, $0\leq z\leq 3$, $0<\delta\leq 1$;
wherein $M^{III}$ comprises Al, Hf, Sc, Y, La, or mixtures thereof;
wherein $M^{IVa}$ comprises Zr, Ge, Sn, or mixtures thereof; and
wherein $M^{IVb}$ comprises Ti.

21. A lithium ion conducting ceramic material having the general formulation:

$$M^I_{1+x+4\alpha-\beta}M^{III}_xM^{IVa}_yM^{IVb}_{2-x-y-\alpha}M^V_zP_{3-z}O_{12}$$

wherein $M^I$ comprises Li;
wherein $0.05\leq x\leq 0.5$, $0.05\leq y\leq 2$, $0\leq z\leq 1$, $0.05<\alpha\leq 0.5$, $0<\beta\leq 1$;
wherein $M^{III}$ comprises Al, Hf, Sc, Y, La, or mixtures thereof;
wherein $M^{IVa}$ comprises Zr, Ge, Sn, or mixtures thereof;
wherein $M^{IVb}$ comprises Ti. and
wherein $M^V$ comprises Si, Ge, Sn, or mixtures thereof.

* * * * *